Feb. 7, 1967     L. C. ELY     3,302,377
BLADE ASSEMBLY FOR A MOWING MACHINE
Filed Dec. 16, 1963     2 Sheets-Sheet 2
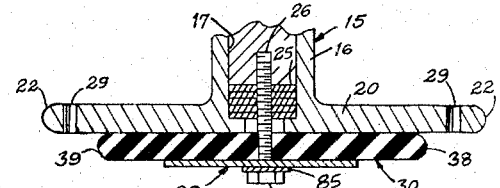
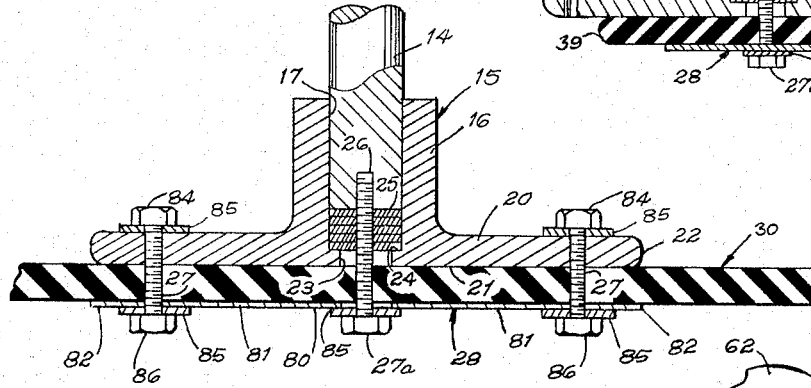
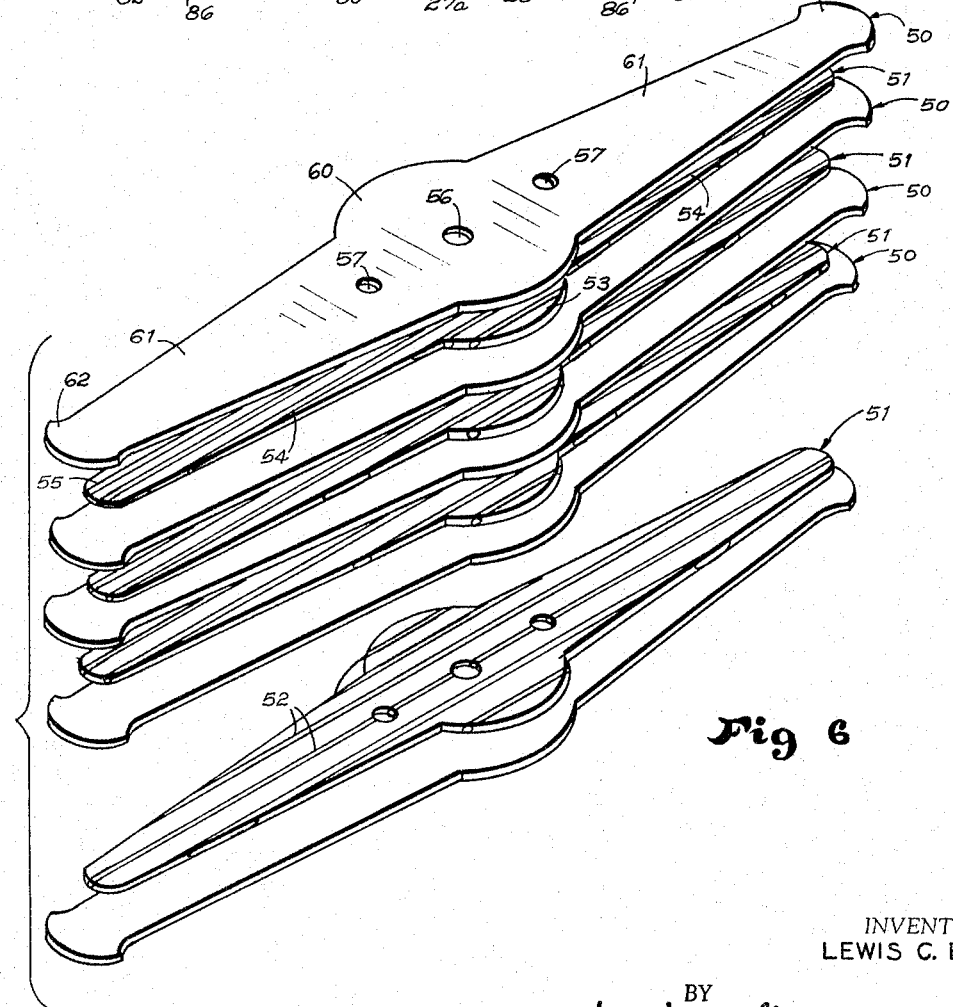
INVENTOR.
LEWIS C. ELY
BY Newton, Hopkins & Jones
ATTORNEYS United States Patent Office 3,302,377
Patented Feb. 7, 1967

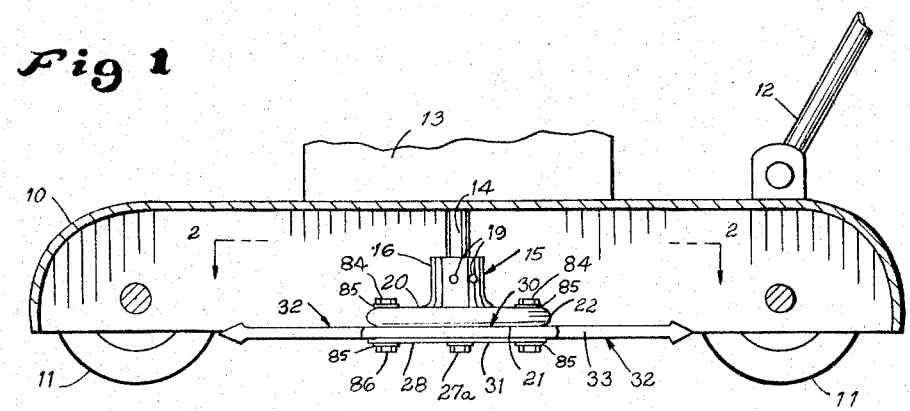

3,302,377
BLADE ASSEMBLY FOR A MOWING MACHINE
Lewis C. Ely, Atlanta, Ga., assignor, by mesne assignments, to Dayco Corporation, Dayton, Ohio, a corporation of Delaware
Filed Dec. 16, 1963, Ser. No. 330,665
13 Claims. (Cl. 56—295)

This invention relates to a blade assembly for a mowing machine and is more particularly concerned with a flexible blade and fly wheel for a rotary type mower.

This application is a continuation-in-part of my copending application, Serial No. 114,822 filed June 5, 1961, for a Rotary Power Lawn Mower Blade now abandoned.

In the past, lawn mower blades have been made of steel or other metal, the forward edges of the rotary blades being sharpened for facilitating the cutting of grass as the blade is rotated and moved over the grass. These rigid blades are dangerous in that, when rotated, the blade is capable of severing the foot of a person if his foot is inadvertently inserted into the path of the blade. Furthermore, the rotating prior art blade tends to hurl outwardly, rocks, pieces of wire and other objects which the blade contacts along its path of mowing. Hence it has become well recognized that a rotary type lawn mower is an extremely hazardous instrument to use and is dangerous in use not only to the operator but to bystanders in its vicinity. Indeed, deaths have been reported from flying objects hurled by a blade of a rotary lawn mower and severe injuries have been reported as a result of persons being cut by rotary lawn mower blades.

While rotary lawn mowers have been extensively used for many years past and there has been a widespread need for a safer blade for the lawn mower, no one to my knowledge, in spite of the longfelt want, has been able heretofore to devise an adequate blade for the rotary type lawn mower which will effectively cut grass and yet be relatively safe to life and limb.

Substantially each time a rotary lawn mower is used, the blade thereof, if moved over rocky ground, engages an object such as a rock, which either slows down or stalls the lawn mower. When this occurs, severe stress is placed upon the drive shaft of the mower, resulting in many instances in a bent drive shaft and an unbalancing of the machine. If the bend is pronounced, the lawn mower can no longer be operated and if the bend is less severe, the lawn mower, if operated, vibrates, causing excessive wear and perhaps damage to the parts of the machine.

The weight of a prior art blade is usually evenly distributed throughout its length, thereby locating the center of percussion of each arm of the blade at a point close to the tip of the blade. On the other hand, the cutting action of the prior art blade occurs within a very short distance of the tip of the blade. Any nicking or breaking of the blade therefore usually occurs at or adjacent the tip of the blade. Because of the uniform weight distribution of the prior art blade damage adjacent the tip of the blade results in a pronounced imbalance disproportionate to the overall weight of the blade.

Briefly, the present invention which minimizes the above described problems and fulfills a longfelt want for a relatively safe lawn mower blade, includes a composite molded rubber blade reinforced longitudinally by less elastic or relatively inelastic fibres. The blade has a wide hub from the prongs of the blade taper outwardly thereby locating the center of percussion inwardly toward the hub of the blade. Operating in conjunction with the blade is a fly wheel assembly which serves the double function of adapting the blade to fit most lawn mowers and serving as a flywheel to provide added momentum to the rotating blade. The flywheel assembly includes a central sleeve which is for surrounding the end of the drive shaft of the lawn mower and a disc-shaped mounting plate, concentrically disposed at the lower end of the sleeve. The blade is removaby mounted on the mounting plate, the hub of the blade being sandwiched between a retainer plate and the mounting plate and retained by bolts and nuts which join the same together.

The blade is symmetrical and flat on both sides having outwardly tapered prongs with side edges which upon rotation of the blade are held in tension for engaging the grass to be cut. Because of its symmetrical shape, the blade may be flipped over so that the trailing side edges may become the leading side edges after the initial leading side edges have become worn.

An important feature of the blade of the present invention is the fact that it is sufficiently flexible so that when rotating it will not cut the shoe of a person, and when rocks are encountered, will slide over the rocks or pulverize them or hurl them only a short distance at low velocity. Hence the present blade eliminates all major hazards to using a rotary mower.

Accordingly it is an object of the present invention to provide a blade assembly for a rotary lawn mower which will effectively cut grass and yet its safe to use and will minimize the danger to persons in the vicinity of the operating lawn mower.

Another object of the present invention is to provide a blade assembly for rotary lawn mowers which is inexpensive to manufacture, durable in structure and efficient in operation.

Another object of the present invention is to provide a non-magnetizable lawn mower blade which does not readily pick up and hurl therefrom, metal objects when the blade is operating on a lawn mower.

Another object of the present invention is to provide a blade for a lawn mower which tends to cut the grass in such a manner that it reduces the tendency of the grass to become brown adjacent the position at which the grass has been cut.

Another object of the present invention is to provide a blade for a lawn mower, the blade being self-sharpening when used.

Another object of the present invention is to provide a flexible lawn mower blade which when rotated is held taut for effectively cutting the grass and yet presents little area for wind resistance.

Another object of the present invention is to provide a blade which when worn by continued use may be reversed so that the trailing side edges of the blade become the cutting edges thereof.

Another object of the present invention is to provide a lawn mower blade assembly which may be quickly and easily installed on a variety of conventional lawn mowers.

Another object of the present invention is to provide a lawn mower blade assembly which, when installed and used on a lawn mower, is so constructed as to impart sufficient momentum to the blade that the lawn mower does not readily stall.

Other objects, features and advantages of the present invention will become apparent from the following description when taken in conjunction with the accompanying drawings wherein like characters of reference designate corresponding parts throughout the several views and in which;

FIG. 1 is a vertical sectional view of a conventional rotary lawn mower to which is attached a blade assembly constructed in accordance with the present invention.

FIG. 2 is an enlarged horizontal sectional view taken substantially along line 2—2 in FIG. 1.

FIG. 3 is a bottom plan view of the blade assembly seen in FIG. 2.

FIG. 4 is a cross-sectional view taken substantially along line 4—4 in FIG. 2.

FIG. 5 is a fragmentary vertical sectional view of the central portion of the blade assembly shown in FIG. 1.

FIG. 6 is an exploded view of the blade of the blade assembly, showing the laminates of the blade prior to the time these laminates are received in a mold for pressing and curing into the blade seen in the preceding figures.

FIG. 7 is a cross-sectional view taken substantially along line 7—7 in FIG. 3.

Referring now in detail to the embodiment chosen for the purpose of illustrating the present invention, it being understood that in its broadest aspects, the present invention is not limited to the exact details herein depicted, numeral 10 in FIG. 1 denotes the blade housing of a conventional lawn mower provided with the usual wheels 11 and handle 12. A motor or engine 13 having the usual drive shaft 14 is carried by housing 10 so that the drive shaft 14 protrudes along the vertical axis of housing 10 downwardy within the hollow central portion of the housing 10 to terminate in spaced relationship to the ground.

The flywheel assembly 15 is attached to the lower end of the shaft 14 and comprises a sleeve 16 which is adapted to fit around the lower end portion of shaft 14 and a mounting plate 20. The sleeve 16 is a hollow cylindrical member having a central bore 17 and a keyway cut axially within the sleeve 16 and in communication with bore 17 for receiving a key 18 by which the flywheel assembly 16 is secured for rotation with the shaft 14. The sleeve 16 is also provided with appropriately internally threaded apertures which receive, therein, set screws 19, the set screws 19 engaging shaft 14 at spaced positions circumferentially.

The flywheel assembly 15 is cast from a non-magnetic, high zinc alloy sufficiently hard and tough to hold threading for the set screws 19 and the keyway for the key 18. The bore 17 to accommodate the drive shaft 14 is preferably sized to fit any ⅞ inch diameter drive shaft whether or not it is provided with a hole 26. Set screws 19 have knurled ends which, regardless of whether a key 18 is provided, will sufficiently lock the flywheel assembly to shaft 14. Thus, the flywheel assembly 15 will fit a variety of lawn mowers presently on the market.

Integrally formed with and mounted on the lower end of sleeve 16 is the flywheel disc or mounting plate 20, the plate 20 having a flat bottom surface 21 and a circular periphery 22. The central portion of plate 20 is counterbored to provide a central hole 23 of smaller diameter than the bore 17. Thus, an internal annular shoulder 24 at the lower end of bore 17 is provided which receives one or a plurality of washers 25 thereon for appropriately spacing the flywheel 15 downwardly with respect to shaft 14.

In certain types of lawn mowers, the shaft 14 is provided with an internally threaded central hole 26 extending from the lower end of shaft 14, inwardly. This hole 26 receives the bolt 27a. In other types of lawn mowers, the shaft 14 has a reduced diameter end (not shown) which is externally threaded. The hole 23 is adapted to receive this reduced diameter end. Adjacent the periphery 22, the mounting plate 20 is provided with additional holes 27 which have vertical axes and in the present embodiment, are diametrically opposed to each other and are equally spaced from the axis of the flywheel assembly 15. Additional air circulation holes 29 are provided in plate 20, the holes 29 being drilled at angles to the vertical axis for scooping air upwardly as the flywheel is rotated.

Mounted on the bottom surface 21 and retained in place by a retainer plate 28 is the flexible resilient blade 30. The blade 30 includes a central circular hub 31 and a plurality of prongs 32 which are equally spaced circumferentially around the hub 31, each prong 32 being integrally secured to the hub 31 by one end and tapering outwardly therefrom. In the present embodiment, the blade 30 is provided with a pair of diametrically opposed, oppositely extending prongs 32 which are spaced 180° from each other even though more than two prongs 32 may be employed, as illustrated in my copending application mentioned above.

Each prong 32 includes a shank portion 33 adjacent the hub 31, and a blade portion 34 outwardly of the shank portion 33, and a tip portion 35 outwardly of the blade portion 34, each portion being integrally connected to the next. Overall, the blade 30, with the exception of the tip portion 35, has a flat continuous upper surface and a flat continuous lower surface parallel to the upper surface.

The hub 31 of the blade 30 therefore is of the same thickness as the shank portions 33 and the blade portions 34 and is of a smaller diameter than the diameter of the mounting plate 20. The bases of the shank portions 33 are slightly smaller than the diameter of the hub 31 while the straight edges 36 and 37 of the shank portions 33 taper outwardly convering toward each other. Preferably the convex edges 38 and 39 of hub 31 and edges 36 and 37 of shank portions 33 are rounded. Other shapes for these edges may be employed if desired.

The straight edges 40 and 41 of the blade portions 34 of blade 30 are essentially extensions of edges 36 and 37 respectively; however, these edges 40 and 41 are each formed as seen in FIG. 4 by an upper concaved portion and a lower concaved portion which meet at the midportion of the blade 30 to provide a straight line junction which extends from the shank portion 33 to the tip portion 35.

The tip portions 35 are bulbous members which are wider and thicker than the end of the blade portions 34 to which they are joined. The outer edge 42 of each tip portion 35 is convexed leading to points forwardly and rearwardly of edges 40 and 41. When viewed from the side, as in FIG. 1, the tip portion 35 is outwardly pointed having outwardly tapered upper and lower flat surfaces the inner ends of which terminate above and below the upper and lower surfaces of the blade 30. Outwardly arcuate inclined surfaces extend respectively upwardly and downwardly from the upper and lower surfaces of the blade 30 at the end of blade portion 34 and terminate at the tapered surfaces of the tip portion 35.

As seen in FIG. 6, the blade 30 is formed from a plurality of flat layers 50 of rubber which are preshaped to the general shape of the blade 30. Interposed between adjacent layers 50 are smaller preshaped nylon cord matrixes 51. The matrixes 51 are formed of a plurality of prestretched parallel longitudinally disposed nylon cords 52 held together by rubber in which the cords 52 are embedded.

The rubber layers 50 are preferably compounded from natural or synthetic rubber based stock which is reinforced with a high abrasive resistant, furnace black, zinc oxide for toughness.

In more detail, each layer of rubber 50 include a hub portion 60, from opposite sides of which extend the prong portions 61. Tip portions 62 are provided respectively on the ends of the prong portions 61, the tip portions 62 being wider than the small ends of the prong portions 61. In like manner, each matrix 51 includes a hub portion 53 and prong portions 54 corresponding to the general shape of the hub portion 60 and prong portions 61; however, the hub portions 53 and prong portions 54 are smaller than the corresponding hub portion 60 and prong portions 61, whereby the perimeter of the layer of rubber 50 overhangs the matrix 51, when the same are in registry. The tips 55 of the matrix 51 are not enlarged but simply are rounded, the relative lengths of each matrix 51 with respect to a layer of rubber 50 being such that in the completed blade 30, the cords 52 terminate within the tip portions 35.

From four to six plies of the nylon cord matrixes 51 are employed for each blade 30, each matrix 51 comprising a plurality of prestretched nylon cord contained in a non-abrasive, non-friction rubber, the whole being chemically treated to enhance bonding when cured between the rubber layers 50.

When molding blade 30, alternate layers of rubber 50 and matrixes 51 are placed in registry in a mold of appropriate shape, the layers of rubber 50 constituting the top and bottom layers or strata. The composite thus formed in the mold is then cured using conventional sulfur curing and utilizing conventional accelerators. By such a procedure, the layers of rubber 50 and matrixes 51 are bonded together while the rubber flows sufficiently to form the final overall shape of blade 30, as previously described.

The completed blade 30 is therefore characterized by an elastomer with longitudinally disposed fibre cords embedded therein. Blade 30 is further characterized by having a tensile strength in excess of 3,000 A.S.T.M. and a durometer hardness of between approximately 70 and 75. Since the fibre i.e., nylon cords 52, which are now embedded in and completely enclosed by the rubber, have been prestretched, the blade 30, even when rotated at 3,000 r.p.m., does not stretch excessively, except that sufficient to tighten and hold taut the cutting edges, such as edges 40 and 41.

For best results, not more than six nor less than four plies of nylon cord 52 should be employed in a blade 30 since, with less than four plies of nylon the blade 30 stretches excessively while with more than six plies of nylon the blade 30 does not stretch sufficiently to hold edges 40 and 41 taut.

It will be understood that, in the preferred embodiment of the present invention as illustrated, the blade 30 is provided with three holes aligned with each other along the longitudinal axis of the blade 30. The central hole 56 is to accommodate the retainer bolt 27a while the diametrically opposed holes 57 on opposite sides of hole 56 are for alignment with holes 27. The holes 56 and 57 may be provided in blade 30 either when molding the blade 30 or thereafter.

The retainer plate 28 which is located below the blade 30 when the blade 30 is mounted on the mounting plate 20, is a flat metal sheet having a central hub 80 and a pair of diametrically opposed prongs 81 which radiate from opposite sides of the hub 80, the prongs 81 being substantially smaller than the prongs 32 and having rounded outer ends or tips 82. The length of retainer plate 28 is slightly greater or approximately the same length as the diameter of mounting plate 20, and is provided with a central hole and two holes in the prongs 81, the holes in retainer plate 28 being aligned respectively with the holes 56 and 57 in the blade 30.

When the holes of the retainer plate 28 are aligned with holes 56 and 57 and the holes 57 are aligned with the holes 27, bolts 84, having washers 85, are passed through these aligned holes so that nuts 86 hold the retainer plate 28 against the bottom of blade 30 and urge the upper surface of blade 30 into engagement with surface 21 of mounting plate 20. Furthermore, the bolt 27a may pass through the center holes, such as hole 56 and 23 to be threadedly received in hole 26.

A typical blade 30 constructed in accordance with the present invention contains 25.45 ends of 840/2 denier monofilament nylon cord 52 preshrunk 3.8% in each of five matrixes 51. The nylon cords 52 may, if desired, be joined by pilot threads (not shown) which are approximately ½ inch apart. The pilot threads extend transversely so as to hold the yarns together.

The typical blade 30 is ½ inch thick and has tip portions 35 which are ⅝ inch thick. The taper of the prong 32 is .209 inch per inch of length, the prong 32 having a width, adjacent the tip portion 35 of $^{27}/_{32}$ inch for a 21 inch blade and 1¼ inch for a 17½ inch blade.

The diameter of the hub portion 31 is 4¼ inches with concaved radii of $1^{1}/_{32}$ inch where the hub 31 merges with the shank portion 33.

Holes 57 are each spaced, on centers, 2 inches from hole 56 so that holes 57 are located in shank portions 33 outwardly of the merged edge portions of the tip hub 31 and shank portions 33.

The taper is quite critical since if less taper is provided, the blade presents an airfoil which may vibrate and if more taper is employed the blade does not spring back to shape readily. The width of the outer end of the prong portion 33 is another critical dimension which should not be varied more than about ±¼ inch.

The tip portion 35 of 17½ inch blade is 1½ inches wide while the tips for progressively longer blades are progressively less wide. For example, a 21½ inch blade would have a tip portion 35, 1 inch wide.

OPERATION

From the foregoing description, the operation of the blade assembly hereinabove described should be apparent. When properly installed on the shaft 14 of a conventional lawn mower, the flywheel assembly 15 will provide sufficient momentum to maintain the engine 13 running after the engine has been started. The blade 30 rotates with the flywheel assembly 15 about the vertical axis of the lawn mower in the same manner that a conventional blade rotates.

As the blade 30 is rotated and the lawn mower is moved over the grass to be cut, the leading edges 40 and 41 of the blade 30, as well as the edges 42 of the tip portion 35, contact the grass. The centrifugal force created by the rotating of blade 30 tends to place the elastomeric material of blade 30 in tension throughout its length whereby the edges 40 and 41 are held quite taut. The nylon cords 52, which reinforce the blade 30 are relatively non-elastic members and prevent excessive elongation of the blade 30. Thus, the maximum stretch of a prong 32, when the blade is rotated at the normal speed of the lawn mower (between 2500 and 3500 r.p.m.) is only about ¼ inch or a stretch longitudinally for the blade 30 of in the neighborhood of ½ inch. From a theoretical standpoint, the surfaces and edges of the blade 30 being relatively tacky, as compared to a steel blade, tends to sever the grass and wipe along the surface of the grass adjacent the severed end, as opposed to a cutting or breaking as would be accomplished by a steel blade. Hence, with the blade 30 of the present invention, the bruised web-like portions of the grass are removed immediately adjacent the severed end of the grass, leaving the veins of the grass. The removal of the web-like portions of the grass removes most of the material which discolors. Therefore, even after several days following cutting, the grass cut by the blade of the present invention appears greener than grass cut with a conventional blade. The rubber content of the blade presents to the fibers of grass during mowing a resilient and somewhat adhesive surface, these qualities being enhanced by the speed of the blade, whereby the stems of the grass, being momentarily adhered to the blade, is snapped or torn off at the height of the blade.

The holes 29 being drilled at angles tend to create a suction in the central portion of the mower and, therefore, draw air over the blades of grass so that they tend to stand upright during a portion of the travel of the mower thereover. The draft created by the holes 29 also tend to spread the severed blades of grass and reduce the windrowing effect of the mower.

The symmetrical shape of blade 30 and the tapered design of prongs 32 present diminishing air foils to the wind to tend to distribute the air pressure evenly over the blade 30, while the centrifugal force tends to hold the blade 30 straight when rotating. Hence, the blade 30, when operating within the normal range of speed of the conventional lawn mower, does not flutter or ripple, as might be exjected. Nevertheless, the blade 30, while being sufficiently rigid to support itself, is sufficiently flexible that it will ride over most obstructions, such as outcroppings of large rocks, without damage to the blade 30. If a smaller rock is encountered, the blade 30 tends to pulverize the rock. In some instances, if the rock is not pulverized, it will be hurled only a short distance.

The blade 30, when rotated, at the normal speed of a conventional mower, will not cut through a shoe of a person, even if held in the path of rotation of the blade 30 for an appreciable time. The shoe does, however, show scuff marks and removal of the polish and perhaps coloring thereon.

The non-magnetic nature of both the flywheel assembly 15 and the blade 30 reduces the likelihood of the blade to pick up metal objects and throw them. Even if such metal objects are encountered and thrown, the velocity thereof is materially reduced as compared to the velocity at which a comparable metal object would have been thrown by a conventional metal blade.

With prolonged use of the blade 30, the cutting edges i.e., one edge 40 and one edge 41, gradually wear away, assuming arcuate concaved contours. This gradually reduces the length of the blade 30. Nevertheless, the blade has a useful life in excess of 100 mowing hours and is self-sharpened by the action of the grass which it cuts. Also, after the cutting edges have become worn, the blade may be reversed by removing it, rotating it 180° about its longitudinal axis and replacing it. Thus, the trailing edges, i.e., the other edges 40 and 41 become the leading or cutting edges.

The resiliency of the blade 30 tends to hold the bolts 27a and 86 in tension while the reduced vibration of the mower reduces the likelihood of these bolts being vibrated to a loosened condition. Nevertheless, the bolts are more readily removed when blade 30 is to be replaced, since the resilient blade 30 will yield when a loosening force is applied to the bolts.

While it is recommended that a proper size blade 30 be used on a mower, i.e., a blade 30 of a diameter at least one-half inch less than the inside diameter of housing 10 an oversize blade 30 may be used, which will be ground by rotation and engagement with housing 10 until it is the proper size.

The following Table I gives the preferred blade sizes which I recommend for various size mowers:

*Table I*

| Blade length or diameter, inches | Mower housing size, inches |
|---|---|
| 17½ | 18–19 |
| 19½ | 20–21 |
| 21½ | 22–24 |

It will be obvious to those skilled in the art that many variations may be made in the embodiments chosen for the purpose of illustrating the present invention without departing from the scope thereof as defined by the appended claims.

What is claimed as invention is:

1. A cutting blade for a mowing machine composed of an elastomer and relatively non-elastic members embedded therein, said elastomer defining an elongated cutting edge of said blade and shielding said non-elastic member from engagement with objects to be cut by said blade.

2. A cutting blade for a mowing machine composed of an elastomer defining the cutting edge of said blade and a relatively non-elastic member, said relatively non-elastic member being embedded in said elastomer and extending substantially throughout its length for resisting elongation of said blade when the same is subjected to centrifugal force.

3. A blade for a mowing machine composed of an elastomer and fibre cords embedded therein for forming an integral member characterized by a central hub and prongs extending from said central hub, said prongs defining cutting edges formed of the elastomer for engaging objects to be cut.

4. An elastomer cutting blade for a mowing machine of the class adapted to be rotated by a shaft within the housing of the mowing machine, a plurality of cutting edges formed by the elastomer of said blade, and means for retarding the elastic elongation of said elastomer when said blade is subjected to rotary forces.

5. An elastomer cutting blade for a mowing machine comprising a circular hub, a plurality of prongs extending from said hub, said prongs being equally spaced circumferentially around said hub, said prongs being tapered outwardly and provided at their outer ends with bulbous tips, said tips having arcuate outer edges and inwardly diverging upper and lower surfaces, said prongs inwardly of said tips defining straight tapered leading and trailing cutting edges, said hub and said prongs having flat parallel upper and lower surfaces.

6. An elastomer cutting blade for mowing machine comprising a hub and a pair of outwardly tapered prongs extending in opposite directions from said hub, said tapered prongs having edges for severing grass, and tips on the outer ends of said prongs, said hub and prongs and tips being integral and cords extending longitudinally thereof from tip to tip, said cords being embedded in said elastomer and sufficiently non-elastic to retard the stretching of said blade under centrifugal force.

7. The structure defined in claim 6 wherein said hub is provided with a central hole and said prongs are provided respectively with holes, said holes being adapted to receive bolts therethrough by which said blade is retained in place.

8. The structure defined in claim 6 wherein the taper of said prongs is approximately .209 inch per inch of length.

9. The structure defined in claim 6 wherein said cords are preshrunk monofilament nylon and said elastomer is synthetic or natural rubber.

10. The structure defined in claim 6 wherein said blade is approximately ½-inch thick, said prongs have a taper of approximately .209 inch per inch of length, and said hub is approximately 1¼ inches in diameter.

11. A cutting element for a rotary blade mower comprising a relatively thin, flat elongate elastomer body defining cutting edges extending over a substantial portion of its length on each side of said body and terminating in enlarged end tip portions.

12. A cutting element for a rotary blade mower comprising a relatively thin, flat elongate elastomer body defining cutting edges extending over a substantial portion of its length on each side of the body, said body being internally reinforced by relatively inelastic cords precluding undue stretching of said element in response to centrifugal force.

13. A lawn mower for cutting grass comprising a main assembly, a shaft element, a motor for driving said shaft element, a cutting element attached to said shaft element adapted to be rotated in a substantially horizontal plane when said shaft is driven by said motor, said cutting element being disposed to cut grass on a surface over which said lawn mower is moved, and said cutting element having a cutting edge composed of an elastic material having inelastic particles therein.

References Cited by the Examiner
UNITED STATES PATENTS

| 2,506,054 | 5/1950 | Agee et al. | 56—26 |
| 2,837,887 | 6/1958 | Hansen | 56—295 |
| 2,854,807 | 10/1958 | Byler et al. | 56—295 |
| 2,869,311 | 1/1959 | Beeston | 56—295 |

ANTONIO F. GUIDA, *Acting Primary Examiner.*